USO10463186B2

United States Patent
Di Ronco et al.

(10) Patent No.: US 10,463,186 B2
(45) Date of Patent: Nov. 5, 2019

(54) DEVICE FOR COOKING AND HEATING AND/OR REVIVING OF PORTIONS OF FRESH AND/OR FROZEN PRE-COOKED PASTA AND OTHER FOOD PREPARATIONS

(71) Applicant: COQUENDAM S.R.L., Venezia Mestre (IT)

(72) Inventors: Basilio Di Ronco, Mirano (IT); Piero Mazza, Mirano (IT); Alessandro Muneratti, Mirano (IT); Rodolfo Valenti, Venice (IT)

(73) Assignee: COQUENDAM S.R.L., Venezia Mestre (IT)

( * ) Notice: Subject to any disclaimer, the term of this patent is extended or adjusted under 35 U.S.C. 154(b) by 399 days.

(21) Appl. No.: 14/910,421

(22) PCT Filed: Aug. 6, 2014

(86) PCT No.: PCT/IB2014/063741
§ 371 (c)(1),
(2) Date: Feb. 5, 2016

(87) PCT Pub. No.: WO2015/019303
PCT Pub. Date: Feb. 12, 2015

(65) Prior Publication Data
US 2016/0174747 A1 Jun. 23, 2016

(30) Foreign Application Priority Data
Aug. 6, 2013 (IT) .............................. TV2013A0129

(51) Int. Cl.
*A47J 27/04* (2006.01)
*A47J 27/00* (2006.01)

(52) U.S. Cl.
CPC ............. *A47J 27/04* (2013.01); *A47J 27/002* (2013.01); *A47J 2027/006* (2013.01); *A47J 2027/008* (2013.01); *A47J 2027/043* (2013.01)

(58) Field of Classification Search
CPC ................................ A47J 27/002; A47J 27/04
(Continued)

(56) References Cited

U.S. PATENT DOCUMENTS

| 3,604,334 A | * | 9/1971 | Ballentine ............... A23L 3/365 |
| | | | 126/369 |
| 3,790,391 A | * | 2/1974 | Bolleter .................. A47J 27/16 |
| | | | 126/20 |

(Continued)

FOREIGN PATENT DOCUMENTS

EP 0273323 A2 7/1988

OTHER PUBLICATIONS

International Search Report dated Nov. 7, 2014 issued in PCT/IB2014/063741.
(Continued)

*Primary Examiner* — Ibrahime A Abraham
*Assistant Examiner* — John J Norton
(74) *Attorney, Agent, or Firm* — Scully, Scott, Murphy & Presser, P.C.

(57) ABSTRACT

A device for steam pressure cooking and heating and/or reviving of portions of fresh and/or frozen pre-cooked pasta and other foods having a frame that accommodates a boiler for producing steam and a tank for water, the device further including a supporting assembly with which a container provided with a handle is associated detachably, a basket, and means for feeding and/or storing and discharging water and a condenser. The basket is arranged detachably in a suspended manner in the pressure-tight container, with means for storing and/or feeding and discharging water from
(Continued)

the boiler to the tank and to and from the pressure-tight container and a condenser for receiving water from the pressure-tight container.

10 Claims, 4 Drawing Sheets

(58) Field of Classification Search
　　USPC .................................. 99/330, 403, 412, 413
　　See application file for complete search history.

(56) References Cited

U.S. PATENT DOCUMENTS

| | | | | |
|---|---|---|---|---|
| 4,420,374 | A * | 12/1983 | Ellis, Jr. ................ | B01D 3/02 |
| | | | | 202/176 |
| 4,635,812 | A | 1/1987 | Mueller | |
| 2005/0284302 | A1* | 12/2005 | Levin ...................... | A61J 9/00 |
| | | | | 99/275 |
| 2009/0252855 | A1* | 10/2009 | Ewald .................... | A47J 29/02 |
| | | | | 426/614 |
| 2010/0151092 | A1 | 6/2010 | Sus et al. | |
| 2011/0256287 | A1 | 10/2011 | Sus et al. | |
| 2012/0174799 | A1* | 7/2012 | Borovicka .......... | A47J 37/0694 |
| | | | | 99/347 |

OTHER PUBLICATIONS

Italian Search Report and Written Opinion dated Feb. 27, 2014 issued in IT TV20130129, with translation of Written Opinion.

\* cited by examiner

DEVICE FOR COOKING AND HEATING AND/OR REVIVING OF PORTIONS OF FRESH AND/OR FROZEN PRE-COOKED PASTA AND OTHER FOOD PREPARATIONS

The present invention relates to a device for cooking and heating and/or reviving of portions of fresh and/or frozen pre-cooked pasta and other fresh and/or pre-cooked and/or frozen food preparations.

Nowadays it is known to use open-top pots or water boilers containing immersion baskets which are used for boiling/cooking raw pasta and/or for simply reviving fresh or frozen pre-cooked pasta, in portions or otherwise, and/or any other food.

US 2010/151092 document relates to an apparatus and method for the heating and cooking of foods by way of injection of steam. In particular during the cooking, the method of US 2010/151092 involves injecting a preset quantity of water into a heated cavity in order to form a quantity of steam necessary to cook a preset quantity of foods.

U.S. Pat. No. 4,635,812 document relates to the heating of food and in particular an apparatus provided with a container for the food which can be fixed by way of an adapted support.

EP 0273323 document relates to a device containing a plurality of pots for cooking separate portions of pasta.

Other conventional cookers/water boilers can be provided, or not, with a system for the capture/condensation of steam and the recirculation of water.

Also known are microwave ovens which are generally used to obtain the mere reviving of prepackaged fresh and/or frozen portions of pre-cooked pasta (ready meals).

Also known are steam ovens and saturated steam pressure ovens (closed enbloc systems) for achieving the cooking and/or the reviving/heating of various foods and also fresh or frozen pre-cooked pasta.

However, such known types of device suffer many drawbacks: for example steam ovens that do not use pressure require lengthy times for cooking and/or reviving; for other models, such as for example some water cookers, in part owing to their size and technical restrictions, their use is limited solely to structures that are specifically adapted to catering and which therefore have suitable space and equipment.

Furthermore, for some water boilers such as those that do not recirculate water, the reviving and/or cooking of the pasta is subject to contamination, owing to pollution of starch and aromas, resulting from previous cooking or reviving operations, given that it was routine to use for example a water boiler that uses the same water for multiple cooking operations; this method entails the release for example of starch into the water which then contaminates the successive quantities of pasta given that they also release starch into it, which is then deposited on the surface of the drained pasta, forming a watery film that produces, when the water evaporates, an effect whereby the pasta is stuck together and/or sticky.

Some immersion water boilers, furthermore, require the use of adapted extractor hoods for condensing the steam that is formed during the cooking or reviving.

Some of these conventional devices can, furthermore, present hygiene-related problems caused by their complex structure which makes the sanitization thereof lengthy and costly.

Other known types of device are cumbersome and rather impractical in their daily use.

The principal aim of the present application is therefore to resolve the above mentioned technical problems, by eliminating the drawbacks in the cited known art and hence providing an invention that makes it possible to achieve, rapidly and easily, the cooking and the heating and/or the reviving of portions of fresh and/or frozen pre-cooked pasta and of other food preparations, such as fresh and/or pre-cooked and/or frozen foods, all with great simplicity in use thereof which makes it simple and practical for the user to use.

Within the above aim, another important object of the invention is to provide an invention that makes it possible to achieve such heating and/or reviving in conditions of the utmost hygiene.

Another object is to provide an invention that is extremely compact, has reduced dimensions and can be easily positioned even in a contained space and together with other devices with no technical/structural restrictions, such as for example the use of extractor hoods for steam and connections to the water mains.

A further object is to obtain an invention that is easy, rapid and practical in use, thus making it possible to easily achieve the preparation of the portion.

Another object is to provide an invention that is structurally simple and low cost and which can be made with the usual conventional plants.

This aim and these and other objects which will become better apparent hereinafter are achieved by a device for steam pressure cooking and heating and/or reviving of portions of fresh and/or frozen pre-cooked pasta and other foods, which comprises an outer enclosure or frame that accommodates a boiler for producing steam and a tank for water, said device further comprising a supporting assembly with which a container provided with a handle is associated detachably, a basket, perforated in a lower region, for said portion being accommodatable detachably therein in a suspended manner, means being present for feeding and/or storing and discharging water and a condenser being present; said device being characterized in that said outer enclosure or frame is box-shaped in order to contain said boiler for producing steam, said tank for supplying water, and usual and known pumps for feeding water; said supporting assembly, accommodated within an adapted enclosure, is constituted by a disk with which a diffuser is associated in a lower region, said disk having a first hole and a second hole for the inflow and outflow of the steam, pipes being connected to said first and second holes and being affected by an inflow solenoid valve and by an outflow solenoid valve that are regulated by an electronic system for adjusting and controlling processes and operating conditions.

Further characteristics and advantages of the invention will become better apparent from the detailed description of a particular, but not exclusive, embodiment, illustrated by way of non-limiting example in the accompanying drawings wherein.

Figure 1:
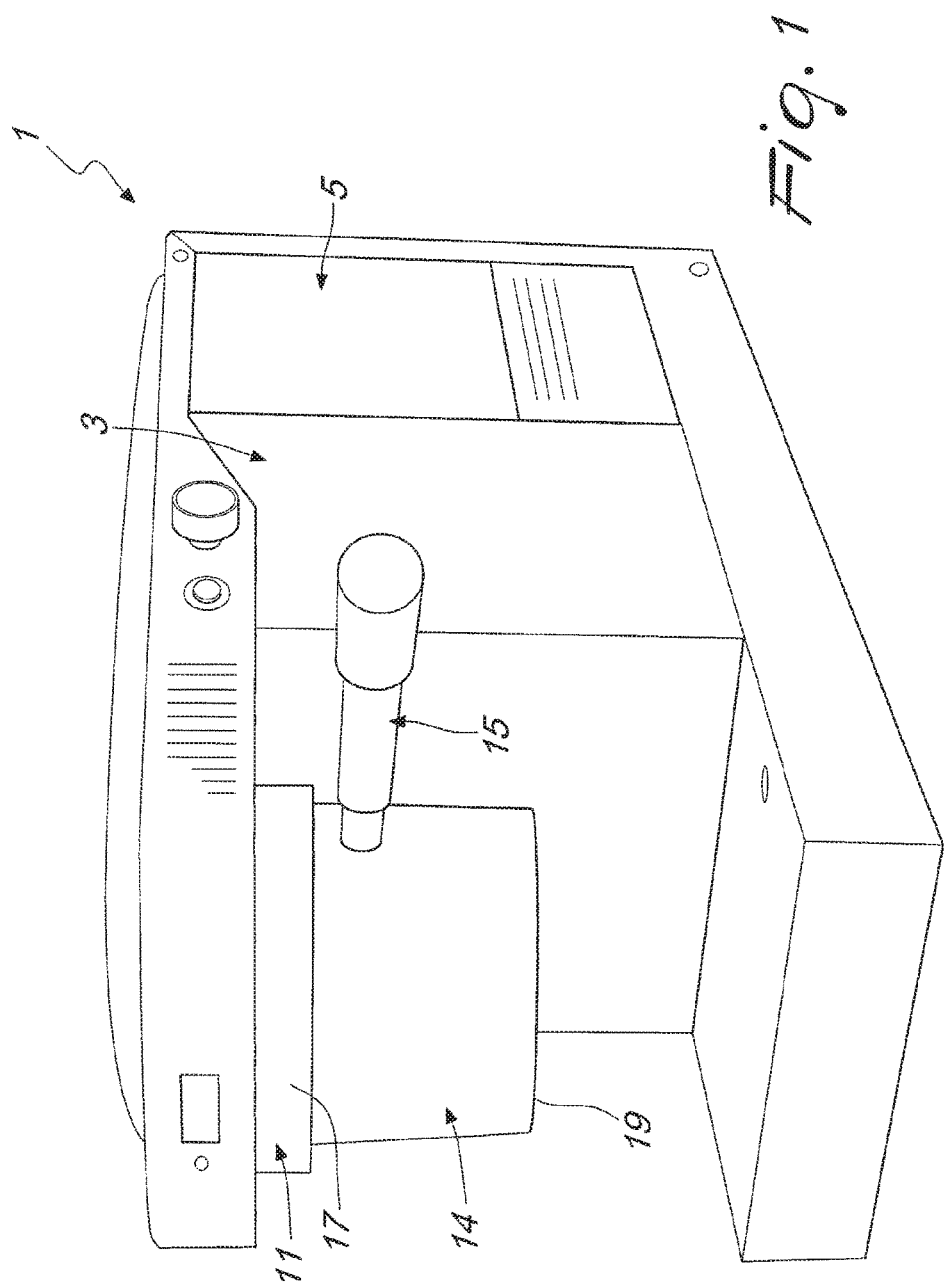
FIG. 1 is a three-quarters view from the side of the device.
Figure 2:
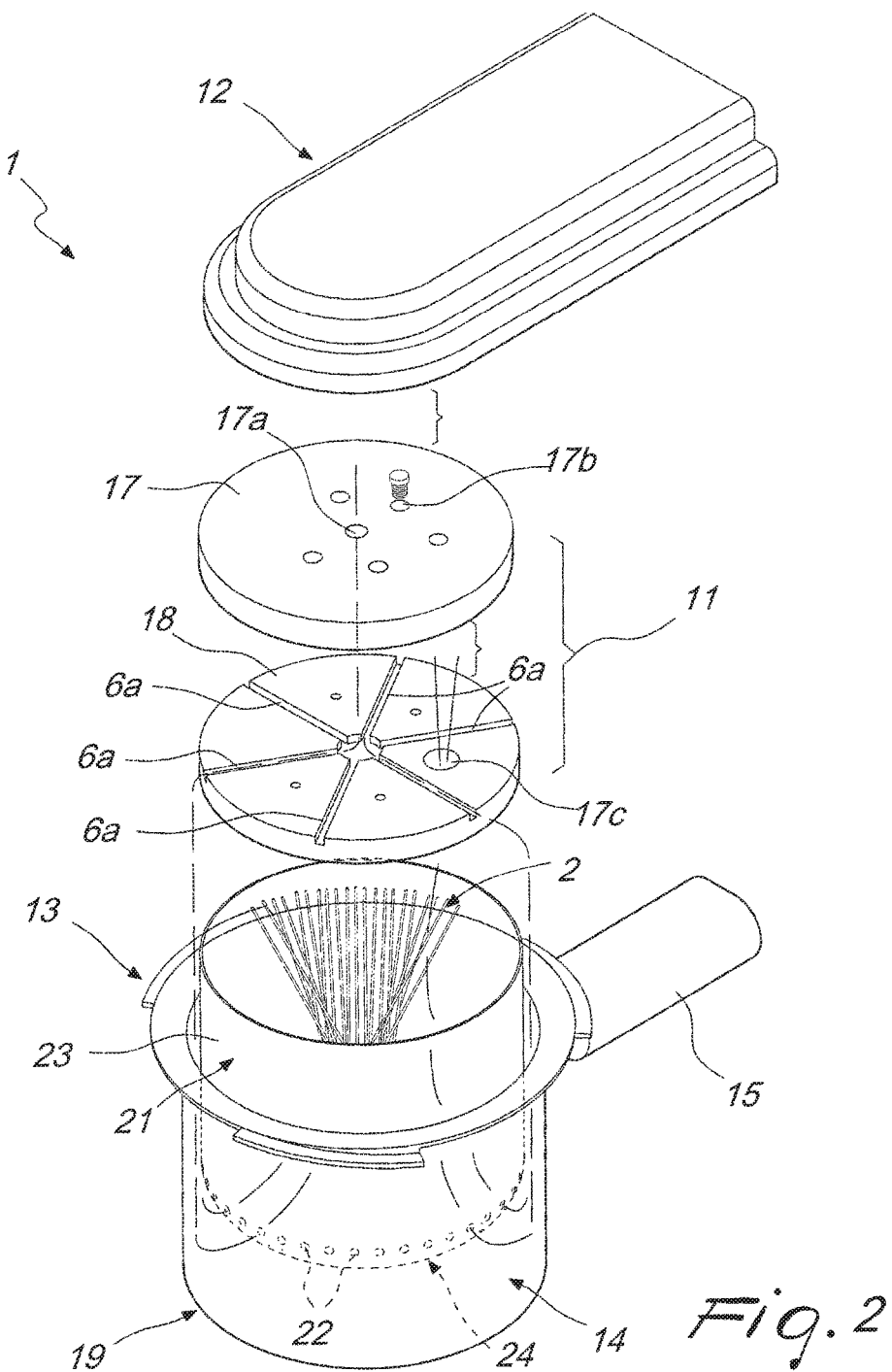
FIG. 2 is an exploded view of some components of the device.
Figure 3:
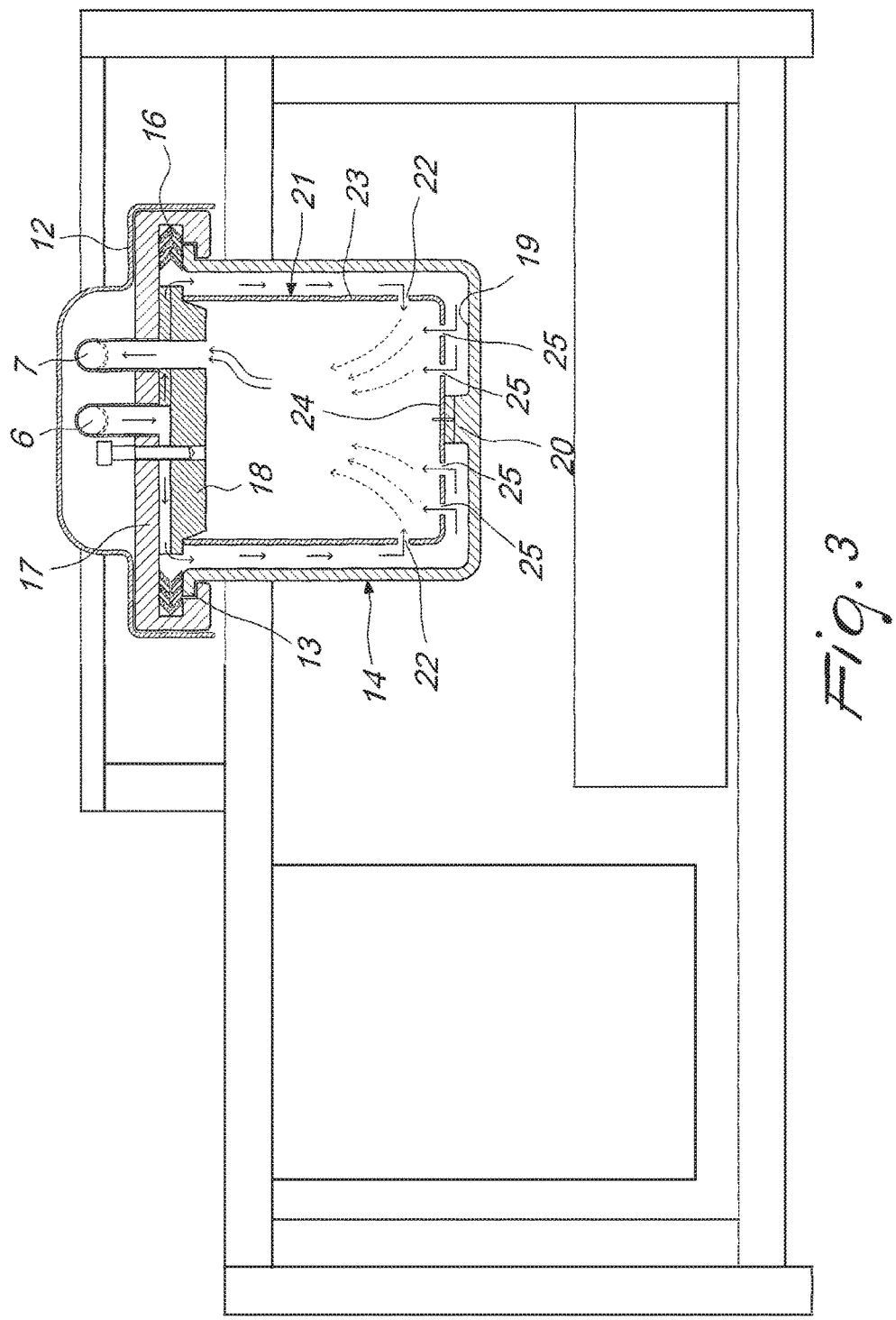
FIG. 3 is a sectional view of some components of the device.
Figure 4:
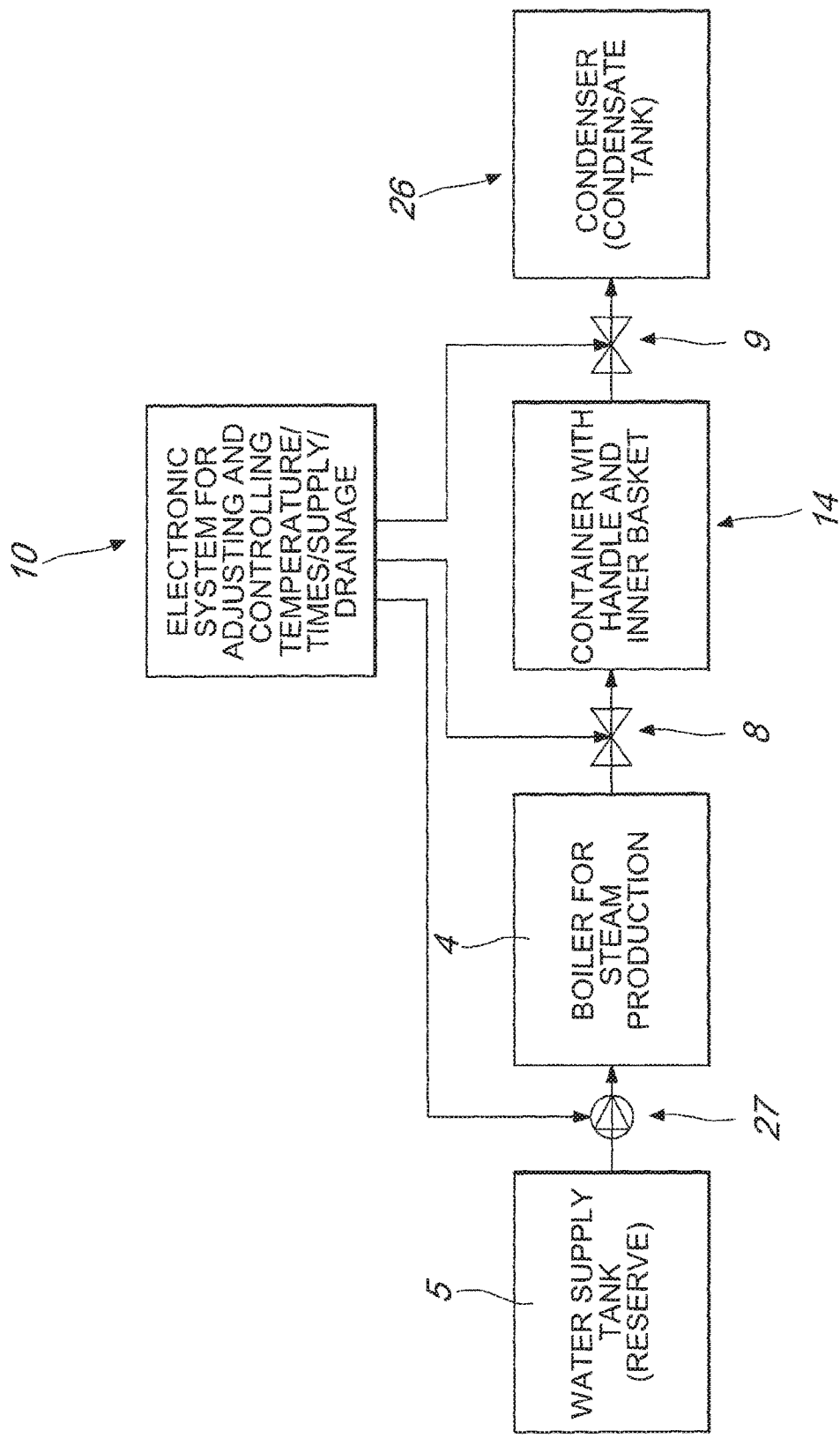
FIG. 4 is a block diagram of the operation of the device.

In the embodiments illustrated, individual characteristics shown in relation to specific examples may in reality be interchanged with other, different characteristics, existing in other embodiments.

Moreover, it should be noted that anything found to be already known during the patenting process is understood not to be claimed and to be the subject of a disclaimer.

With reference to the figures, the reference numeral 1 generally designates a device for steam pressure cooking and heating and/or reviving of portions 2 of fresh and/or frozen pre-cooked pasta and of other foods, which comprises an outer enclosure or frame 3 that is box-shaped in order to contain a boiler 4 for producing steam, a tank 5 for supplying water, and usual and known pumps and solenoid valves for feeding and discharging water and/or steam.

The boiler 4 is a steam generator using an electric resistance in which the volume of liquid/water inside the boiler 4 will be kept constant by an adapted pump 27 that will come in function if activated by an adapted and conventional level sensor (not shown).

The steam generator is provided with all the elements for adjustment and control required by the regulations in force and is connected, by way of adapted pipes 6, 7, which are conveniently affected by an inflow solenoid valve 8 and by an outflow solenoid valve 9 which are regulated by an electronic system for adjusting and controlling processes and operating conditions 10, to a supporting assembly 11 accommodated in an adapted enclosure 12.

The electronic adjustment and control system 10 controls the temperature and pressure levels and the times for dispensing and discharging steam.

The supporting assembly 11 is constituted by a disk 17 with which a diffuser 18 is associated in a lower region; the disk 17 has a first hole 17*a*, for the inflow of the steam, and a second hole 17*b* for the outflow of the steam.

Such first and second hole 17*a*, 17*b* are connected to the pipes 6, 7; in particular, the pipe 6 is connected to ducts 6*a* that are provided radially to the upper surface 6*b* of the diffuser 18.

The pipe 7 is connected, by way of the second hole 17*b* provided on the disk 17, to a third, through hole 17*c*, which is provided on the diffuser 18.

A container or pot 14 provided with a handle 15 that protrudes from it radially can be associated detachably with the supporting assembly 11, and in particular with the disk 17, by means of a bayonet coupling 13 of the type used in espresso coffee machines.

There is an adapted gasket 16, which is adapted to ensure the seal of the pressure present in the container 14 and with characteristics that are such as to ensure a locking that is simple and effortless. Preferably the sealing gasket is provided by an elongated rubber pad, so as to ensure an optimal seal but without requiring an excessive level of force in the contact between the surfaces of the disk 17 or upper support and the external detachable container 14.

The container 14 is advantageously cylindrical, is open upwardly, and is provided internally, at the lower end face 19, with a protrusion 20 that protrudes axially therefrom.

A basket 21 is arrangeable detachably and in a suspended manner with respect to the lower end face 19 inside the container 14, and has an outer diameter that is smaller than that of the container 14 and can optionally be provided with a plurality of fourth holes 22 provided on its lateral surface 23 only proximate to the bottom 24.

The basket can be fixed stably or otherwise to the protrusion 20, either in order to allow an easy draining of the portion once cooked, or in order to be able to change it.

At the bottom 24 of the basket 21 there is a plurality of fifth holes 25.

The portion 2 of fresh and/or frozen pre-cooked pasta and of other foods can be arranged in the basket 21.

The basket 21, once the container 14 is fastened to the supporting assembly 11, abuts hermetically on the bottom of the diffuser 18, thus creating a space between the inner wall of the container 14 and the outer wall of the basket 21 where the steam in output from the diffuser assembly 18 is forced.

The fourth and fifth holes 22, 25 make it possible to convey the steam from below toward the inside of the basket 21 and ensure a rapid and uniform heating of the food.

The supporting assembly 11 is connected to the boiler 4 and to a condenser 26 by way of the pipes 6, 7, which are affected by the inflow solenoid valve 8 and by the outflow solenoid valve 9 which are governed by the electronic adjustment and control system 10.

The electronic system 10 for adjusting and controlling processes and operating conditions, in addition to regulating the circulation cycles of the steam, also monitors the various safety elements with which the device 1 is provided and which verify the correct closure of the container 14 on the supporting assembly 11, prevent the disengagement of the container 14 in the presence of pressure inside it, constantly check the pressure and the temperature that are present inside it, and other functions that are considered necessary for the correct and safe operation of the apparatus.

The condenser 26 is constituted by a receptacle provided with a coil immersed in the liquid for cooling/condensing the steam.

The operation is as follows: once the portion of pasta or other food is arranged in the basket 21 inside the container 14, the latter is clamped to the supporting assembly 11 easily, rapidly and safely thanks to the bayonet coupling; the operator then acts on an adapted keypad arranged on an adapted control panel/conventional control associated with the outer enclosure 3 in order to start the cycle of heating/cooking.

At this point the steam, which is produced continuously by the boiler 4, is introduced into the container 14 by way of the inflow solenoid valve 8.

The inflowing steam is conveyed along a preset path that forces it to cross the food arranged inside the basket 21, in this manner ensuring the uniform, fast and complete heating and/or cooking of the food.

The whole process is managed by an electrical/electronic system that integrates the time/temperature/pressure functions by acting on the electrical elements, and on the steam inflow and outflow solenoid valves.

The outflowing steam is finally channeled into the condenser 26 where it is collected in liquid form.

At the end of the cycle the operator decouples the container 14 and can then pour the hot meal directly onto the plate or into another dispenser, ready to be used.

The device illustrated combines the steam pressure heating/cooking of the portion of food with an original, practical, fast and clean system for managing the portion to be prepared and served.

Such system of steam pressure cooking/heating makes it possible to obtain, very rapidly and with great practicality and ease of use, a high quality product since there is no impoverishment of the product in the cooking water.

The portion of pasta furthermore is always in a "clean" environment, i.e. it is not contaminated by previous cooking operations.

Since there are no emissions of steam, there is no need for a dedicated room such as a kitchen, or for an extractor hood.

Since it is provided with an independent tank of feed water for the boiler and with a detachable tank for the condensate of the steam, the device does not require connections to the water mains and to the drain system of the building.

Thus it has been found that the invention fully achieves the intended aim and objects, a device being obtained that makes it possible to achieve, rapidly and easily, the cooking and the heating and/or the reviving of portions of fresh and/or frozen pre-cooked pasta and of other food preparations in conditions of the utmost hygiene, thanks partly to the possibility of using a separate perforated container for each portion, or of rapidly and easily washing such container before its reuse.

With respect to conventional devices, the device according to the present invention entails the cooking/heating of the portion in an environment/container under pressure, which ensures the speed of cooking and takes advantage of a special forced circulation of the steam in the cooking environment thanks to which a uniform cooking/heating is obtained. Furthermore, in the device according to the present invention, the outflowing steam is condensed in order to prevent dispersion into the environment.

The device according to the invention comprises a perforated basket, which differently from conventional devices is arranged in abutment with the upper lid so as to ensure the seal. In this manner the steam is forced to circulate from above, to then descend between the outer part of the basket and the enclosure of the pot, and then reascend into the internal part of the basket through the holes defined at the base thereof. In this manner the steam crosses, in great quantities and with considerable speed, the food to be heated, finally exiting through the outflow solenoid valve arranged on the lid of the pot and which takes the steam to the condenser. Therefore the device, which comprises, inter alia, solid perimeter walls 21 which are not present in the prior art documents, entails a channeling of the fluid/steam, which solves the problems and drawbacks of conventional cooking devices. Thanks to the device according to the present invention in fact the steam is forced to pass along a mandatory and well-defined path, which is indispensable in order to ensure an effective and homogeneous heating of the food in reduced times.

The device is furthermore structurally extremely compact, having reduced dimensions that make it easily positionable even in a contained space and together with other devices.

The device furthermore makes it possible to easily achieve the preparation and consumption of the portion, thanks also to the rapid and secure coupling, of the bayonet type, of the supporting assembly.

Preferably in the device according to the present invention, the delimited space that is created, with the container closed and with the basket 21 in abutment hermetically on the bottom of the diffuser 18, between the inner wall of the container 14 and the outer wall 23 of the basket 21 in the fourth and fifth holes 22, 25 makes it possible to convey, by force into the basket 21 from below, the steam flowing out from the diffuser 18 and ensure a rapid and uniform heating of the food.

Lastly, the device can be used in bars, sandwich bars, restaurants, hotels, eating houses, cafeterias, pastry shops, pizzerias, diners, company canteens, refreshment areas in private and public premises, and in household locations, given its simplicity of construction.

Naturally the materials used as well as the dimensions of the individual components of the invention may be more relevant according to specific requirements.

The characteristics indicated above as advantageous, convenient or similar, may also be missing or be substituted by equivalent characteristics.

The content of Italian patent application no. TV2013A000129, the priority of which is claimed in the present application, is incorporated as a reference.

The invention claimed is:

1. A device for steam pressure cooking and heating and/or reviving of portions of fresh and/or frozen pre-cooked pasta and other food preparations, which comprises:
    an outer enclosure that accommodates a boiler for producing steam and a tank for water,
    a supporting assembly with which a pressure-tight container, provided with a handle, is associated detachably,
    a basket, perforated in a lower region, for said portion wherein the basket is arranged detachably in a suspended manner in the pressure-tight container, means being present for storing and/or feeding and discharging water from the boiler to the tank and to and from the pressure-tight container, and
    a condenser being present for receiving water from the pressure-tight container, wherein said supporting assembly is constituted by a disk with which a diffuser is associated in a lower region, said disk having a first hole for inflow of the steam and a second hole for outflow of the steam, pipes being connected to said first and second holes.

2. The device according to claim 1, wherein said outer enclosure is box-shaped in order to contain said boiler for producing steam, said tank for supplying water, and a pump for feeding water, and wherein a supporting assembly is accommodated within an adapted enclosure.

3. The device according to claim 2, wherein said connected pipes comprise a first pipe and a second pipe, said first pipe being connected to ducts that are provided radially to the upper surface of said diffuser, said second pipe being connected, by way of said second hole provided in said disk, to a third, through hole provided in said diffuser.

4. The device according to claim 3, wherein said basket has an outer diameter that is smaller than that of said container and has a plurality of fourth holes provided on its lateral surface proximate to the bottom.

5. The device according to claim 4, wherein said basket has, at said bottom, a plurality of fifth holes.

6. The device according to claim 5, wherein said fourth and fifth holes convey the steam and ensure a uniform heating of the food.

7. The device according to claim 2, wherein said handle protrudes radially from the pressure-tight container and wherein said handle can be associated detachably with said supporting assembly and with said disk by means of a bayonet coupling of the type used in espresso coffee machines.

8. The device according to claim 2, further comprising an electronic system that, in addition to controlling the temperature and pressure levels and the times for dispensing and discharging steam, also monitors the various safety elements with which the device is provided wherein the safety elements comprise means to verify the correct closure of said container on said supporting assembly, means to prevent the disengagement of said container in the presence of pressure inside it and means to constantly check the pressure and the temperature that are present inside it.

9. The device according to claim 1, wherein said container is cylindrical, is open upwardly and is provided internally, at a lower end face, with at least one protrusion that protrudes axially from it, said basket being arrangeable detachably and in a suspended manner with respect to said lower end face inside said container.

10. The device according to claim 1, wherein said condenser is constituted by a vessel provided with a coil that is immersed in the liquid for cooling and condensing the steam.

\* \* \* \* \*